(12) United States Patent
Kato et al.

(10) Patent No.: US 6,597,393 B2
(45) Date of Patent: *Jul. 22, 2003

(54) CAMERA CONTROL SYSTEM

(75) Inventors: Eiji Kato, Yokohama (JP); Youichi Kazama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,100

(22) Filed: Jun. 8, 1998

(65) Prior Publication Data

US 2001/0033332 A1 Oct. 25, 2001

(30) Foreign Application Priority Data

Jun. 10, 1997 (JP) ............................... 9-152308

(51) Int. Cl.<sup>7</sup> ............................... H04N 5/232
(52) U.S. Cl. ........................... 348/211.99; 348/211.11; 348/211.6; 348/211.12; 348/211.13
(58) Field of Search ............................ 348/15, 16, 211, 348/143, 153, 14.07, 14.08, 14.09, 14.11, 159, 211.6, 211.3, 211.99, 211.11, 211.12, 211.13

(56) References Cited

U.S. PATENT DOCUMENTS

| | | | | |
|---|---|---|---|---|
| 4,037,250 A | * | 7/1977 | McGahan et al. | 348/159 |
| 4,992,866 A | * | 2/1991 | Morgan | 348/159 |
| 5,745,161 A | * | 4/1998 | Ito | 348/15 |
| 5,825,432 A | * | 10/1998 | Yonezawa | 348/159 |
| 5,995,140 A | * | 11/1999 | Cooper et al. | 348/159 |
| 6,002,995 A | * | 12/1999 | Suzuki et al. | 348/211 |
| 6,122,005 A | * | 9/2000 | Sasaki et al. | 348/211.3 |

* cited by examiner

*Primary Examiner*—Wendy R. Garber
*Assistant Examiner*—Luong Nguyen
(74) *Attorney, Agent, or Firm*—Robin, Blecker & Daley

(57) ABSTRACT

In observing images picked up by a plurality of cameras connected to a network in a surveillance camera system or the like, the conventional arrangement necessitates a client device to switch an image display obtained from one camera over to an image display obtained from another by a manual operation, which has been troublesome. To solve this problem, a camera control system is arranged to automatically switch an image display obtained from one camera over to an image display from another at suitable intervals. The camera control system is further arranged to automatically control the image pickup directions of each camera and, in the event of occurrence of an error in any of the cameras, to carry on its automatic control operation by skipping the camera at which the error has occurred.

12 Claims, 9 Drawing Sheets

CAMERA CONTROL SYSTEM

BACKGROUND OF THE INVENTION

1. Field of the Invention

The present invention relates to a camera control system arranged to permit one or a plurality of persons to perform a remote operation on one or a plurality of cameras and to be usable, for example, for a video conference system, a surveillance camera system, etc.

2. Description of Related Art

In observing images outputted from a plurality of cameras connected to a network in a surveillance camera system, for example, it has been practiced to manually switch the display of images outputted from these cameras from one camera over to another on the side of a client.

However, it is very important for surveillance camera systems or the like in general to keep constant watch over the images picked up by cameras. Therefore, the manual switching of image displays under surveillance from the image output of one camera over to that of another camera has been extremely troublesome.

BRIEF SUMMARY OF THE INVENTION

In view of the above-stated problem of the prior art, it is an object of the invention to provide a camera control system arranged to automatically switch the display of the image output of one camera over to that of another camera at suitable intervals and also to automatically control the image pickup direction of each of cameras.

It is another object of the invention to provide a camera control system arranged to appositely carry out control, in the event of occurrence of an error due to service interruption of a network line or due to some malfunction of a camera, by informing a client of the error while cameras are under automatic operation control.

To attain at least one of the above objects, in accordance with one aspect of the invention, there is provided a camera control system capable of controlling a plurality of video cameras, which comprises video camera setting means for setting, from among the plurality of video cameras, a plurality of video cameras to be controlled, video camera storing means for storing information on the video cameras set by the video camera setting means, switching means for switching over, at intervals of a predetermined period of time, display of images picked up by the video cameras stored in the video camera storing means, and display means for displaying an image picked up by each of the video cameras selected by the switching means.

To attain at least one of the above objects, in accordance with another aspect of the invention, there is provided a control method for a camera control system capable of controlling a plurality of video cameras, which comprises a video camera setting step of setting, from among the plurality of video cameras, a plurality of video cameras to be controlled, a video camera storing step of storing information on the video cameras set by the video camera setting step, a switching step of switching over, at intervals of a predetermined period of time, display of images picked up by the video cameras stored by the video camera storing step, and a displaying step of displaying an image picked up by each of the video cameras selected by the switching step.

To attain at least one of the above objects, in accordance with a further aspect of the invention, there is provided a storage medium which stores therein a program for executing control over a camera control system capable of controlling a plurality of video cameras, the program comprising processes of setting, from among the plurality of video cameras, a plurality of video cameras to be controlled, storing information on the video cameras set, switching over, at intervals of a predetermined period of time, display of images picked up by the video cameras stored, and displaying an image picked up by each of the video cameras selected.

These and other objects and features of the invention will become apparent from the following detailed description of an embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
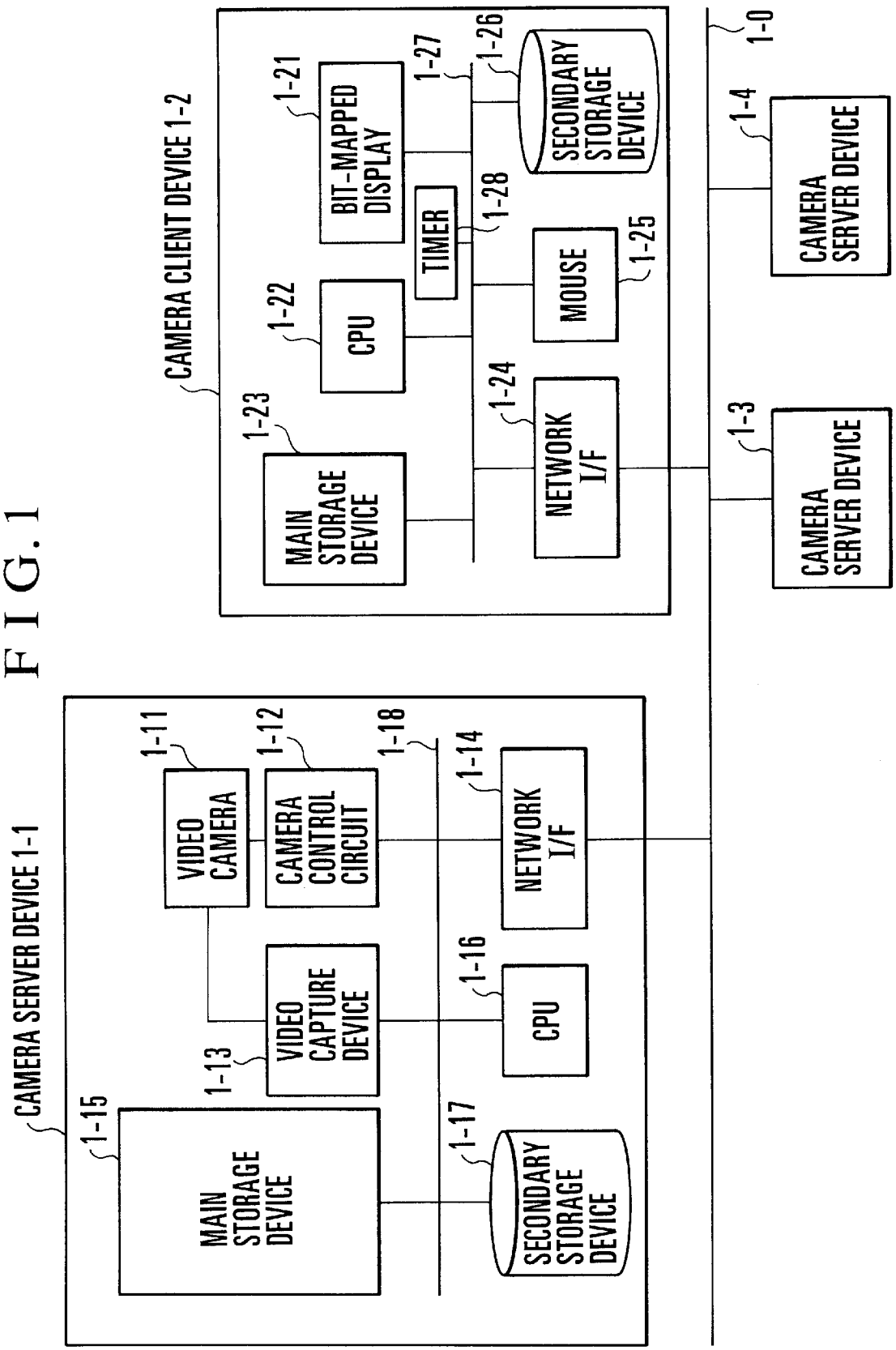
FIG. 1 is a block diagram showing the arrangement of a camera control system according to an embodiment of the invention.

FIG. 1 is a block diagram showing the arrangement of a camera control system according to an embodiment of the invention. The camera control system shown in FIG. 1 includes camera server devices 1-1, 1-3, 1-4, . . . and a camera client device 1-2. The camera server devices 1-1, 1-3, 1-4, . . . and the camera client device 1-2 are connected to one another by a network 1-0. Each of the camera server devices 1-1, 1-3 and 1-4 is arranged to take in an image picked up by a video camera, to send data of the image to the camera client device 12, to receive camera control commands from the camera client device 1-2 and to control the video camera according to the camera control commands.

In the camera control system, no particular limit is set to the number of camera client devices. The camera client device 1-2 is arranged to receive data of images from the camera server devices 1-1, 1-3, 1-4, . . . and to display the images. The camera client device 1-2 is allowed to control cameras after acquiring a camera control right by sending requests for the camera control right to the camera server devices 1-1, 1-3, 1-4, . . . In this embodiment, cameras are arranged to be exclusively controlled and cannot be controlled by a plurality of camera client devices at the same time.

The camera server devices 1-1, 1-3, 1-4, . . . are arranged in the same manner in the case of this embodiment, thought they may be arranged differently from each other. The camera server device 1-1 is next described in detail as follows.

The camera server device 1-1 includes a video camera 1-11, a camera control circuit 1-12 which controls the panning and tilting actions and the zoom magnification of the video camera 1-11, a video capture device 1-13 which takes in images outputted from the video camera 1-11, a network interface (I/F) 1-14 arranged to deliver data of the taken-in images onto the network 1-0, a CPU 1-16 arranged to perform overall control over the internal operation processes of the camera server device 1-1, a main storage device 1-15, and a secondary storage device 1-17 which is a hard disk or the like arranged to store a control program for controlling the camera server device 1-1.

The CPU 1-16 is arranged to receive, through the network interface 1-14, camera control instructions and to cause the camera control circuit 1-12 to carry out panning, tilting and zooming actions on the camera 1-11.

The video capture device 1-13 is arranged to take in a video signal of the NTSC system or the like from the video camera 1-11, to analog-to-digital (A/D) convert the video signal into image data, to compress the image data and to supply the compressed data through the network interface 1-14 to a camera client device (the camera client device 1-2 in the case of this embodiment) which is having access to the camera server device 1-1. The image compressing method to be employed for the video capture device 1-13 may be any of known image compressing methods, such as motion JPEG, MPEG, etc. A system bus 1-18 is arranged to interconnect these component units.

The arrangement of the camera client device 1-2 is next described as follows.

Compressed image data sent from the camera server device 1-1 or the like to the network 1-0 is received by the camera client device 1-2 through a network I/F 1-24. At the camera client device 1-2, the compressed image data is expanded by a CPU 1-22. Then, an image picked up is displayed on a bit-mapped display 1-21.

Figure 2:
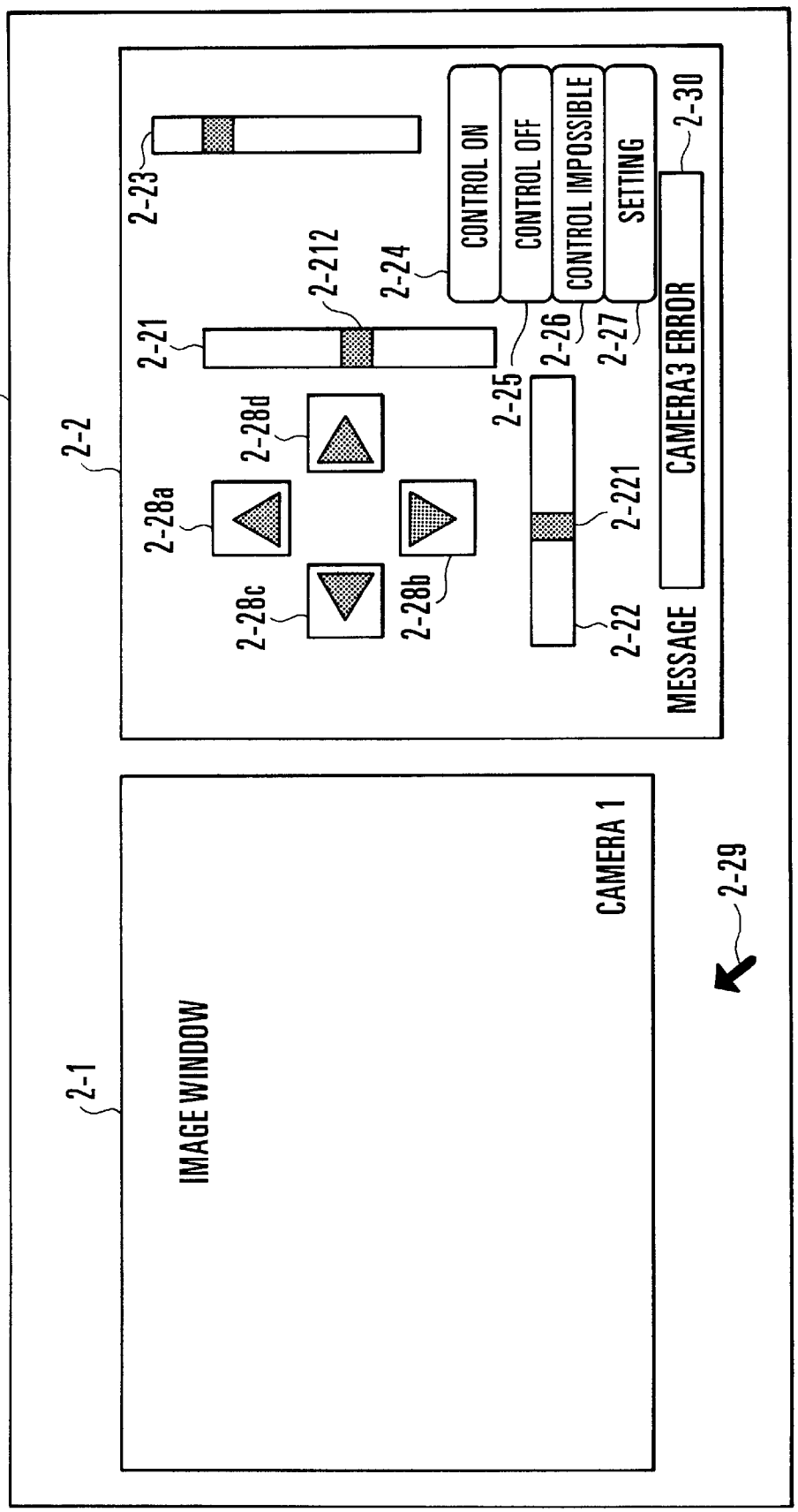
FIG. 2 shows one example of a user interface image plane.

On the bit-mapped display 1-21, a user interface image plane is assumed to be displayed, for example, as shown in FIG. 2. The picked-up image is displayed on an image window 2-1 of the bit-mapped display 1-21.

Further, at the camera client device 1-2, the CPU 1-22 is arranged to execute a program stored in a secondary storage device 1-26 which is a hard disk or the like. With the program executed, a window system which forms a display image plane 2-3, for example, as shown in FIG. 2 is operated. A main storage device 1-23 which is composed of a RAM or the like is arranged to store the program called out from the secondary storage device 1-26. The CPU 1-22 calls out programs from the main storage device 1-22 as necessary. A mouse 1-25 is a pointing device which is arranged to move a cursor 2-2 shown in FIG. 2 and to enable the user to control the video camera 1-11 by performing a clicking or dragging operation on the mouse 1-25. A timer 1-28 is arranged to count time for change-over of cameras and time for image pickup intervals, etc.

Figure 3:
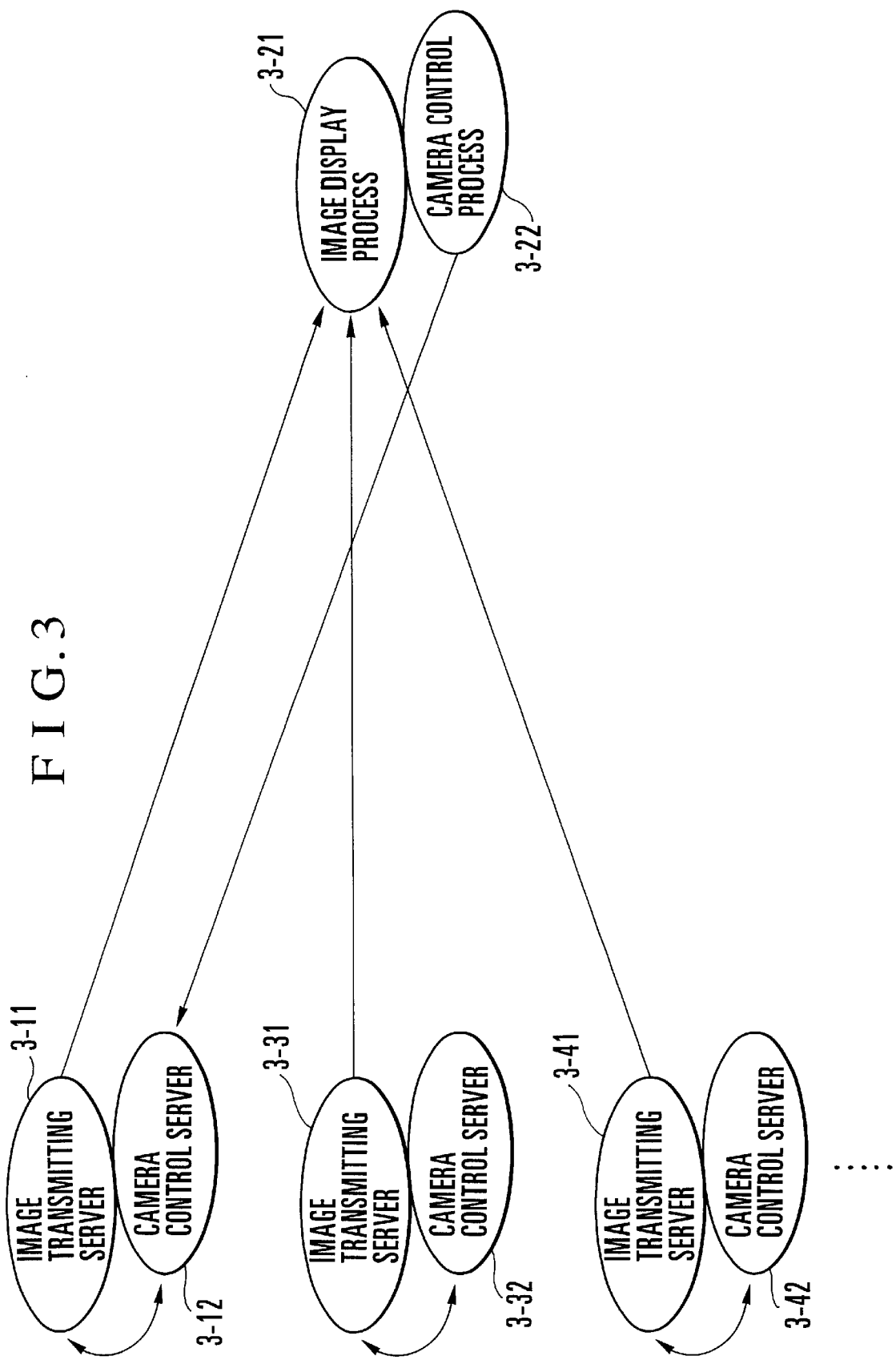
FIG. 3 shows a software arrangement of the camera control system according to the embodiment of the invention.

FIG. 3 shows a software arrangement in this embodiment. Referring to FIG. 3, at the camera client device 1-2, an image display process 3-21 and a camera control process 3-22 are in operation. These software parts are stored in the secondary storage device 1-26.

Meanwhile, an image transmitting server 3-11 which is provided for sending out image data and a camera control server 3-12 which is for a process of causing camera control according to a command from the camera client device 1-2 are also in operation at the camera server device 1-1. Other camera server devices 1-3, 1-4, etc., are likewise arranged to have image transmitting servers 3-31, 3-41, etc., and camera control servers 3-32, 3-42, etc., respectively in operation. These parts of software are stored in the secondary storage device 1-17 of the camera server device 1-1 and those of other server devices.

The image transmitting server 3-11 acts at the camera server 1-1 to take in, compress and deliver the images. The image display process 3-21 is acting at the camera client device 1-2 to take in, expand and display on the image window 2-1 the image data sent from the image transmitting server 3-11 through the network.

Each of the camera control servers 3-12, 3-32, 3-42, . . . , acts to receive a camera control instruction from the camera control process 3-22 of the camera client device currently in control of the camera and to control the camera by causing the camera control circuit 1-12 to act.

The camera control process 3-22 is arranged to display a camera control window 2-2 (FIG. 2) on the bit-mapped display 1-21 to provide a user interface to enable the user to perform various camera operations. The camera control window 2-2 displayed by the camera control process 3-22 on the display image plane 2-3 as shown in FIG. 2 is arranged as described below.

Referring to FIG. 2, the camera control window 2-2 shows buttons 2-28*a*, 2-28*b*, 2-28*c* and 2-28*d*, which are provided for forming control instructions to move the image pickup direction of the video camera 1-11 respectively upward, downward, rightward and leftward. These image pickup direction control instructions can be issued also by moving the cursor 2-29 to indexes 2-212 and 2-221 on scroll bars 2-21 and 2-22 and by performing cursor dragging operations on these indexes. The scroll bars 2-21 and 2-22 are arranged to enable the user to issue the control instructions for moving the image pickup direction of the video camera in the tilting direction and the panning direction, respectively.

FIG. 2 shows also another scroll bar 2-23. The scroll bar 2-23 is provided for varying a zoom magnification of the video camera. A camera control instruction for varying the zoom magnification can be issued by performing a dragging operation on the scroll bar 2-23 with the mouse 1-25. The camera control instructions thus issued are supplied through the network 1-0 to the camera server device 1-1 or to other applicable camera server devices.

A message part 2-30 is provided for giving a warning, for example, against occurrence of an error in a video camera connected by displaying the name of the video camera where the error has occurred.

When the user wishes to control the video camera 1-11, the user sends a request to the camera control server for acquiring the right to control the camera by clicking at the control ON button 2-24.

When the camera control right is acquired, the buttons of varied kinds on the camera control window 2-2 can be operated by the user. Further, in a case where the video camera 1-11 is not controllable by the user because the video camera 1-11 is currently under control of some other camera client device, or the video camera 1-11 is out of order or because of some other reason, a "CONTROL IMPOSSIBLE" button 2-26 lights up on the display panel 2-26.

In a case where the camera control right cannot be acquired, all the buttons of varied kinds except the control ON button 2-24 cannot be operated and the camera client device comes into a state of waiting for the camera control right. When the camera control OFF button 2-25 is operated by clicking the mouse 1-25, a camera control right relinquishing instruction is issued. Then, it becomes no longer possible to perform a camera control operation. After that, the camera control right is passed to some other camera client device that has been waiting for the camera control right.

A setting button 2-27 is provided for switching the display on the display image plane 2-3 over to the display of a setting mode in which each of video cameras connected to their respective camera server devices is allowed to be automatically operated.

Figure 4:
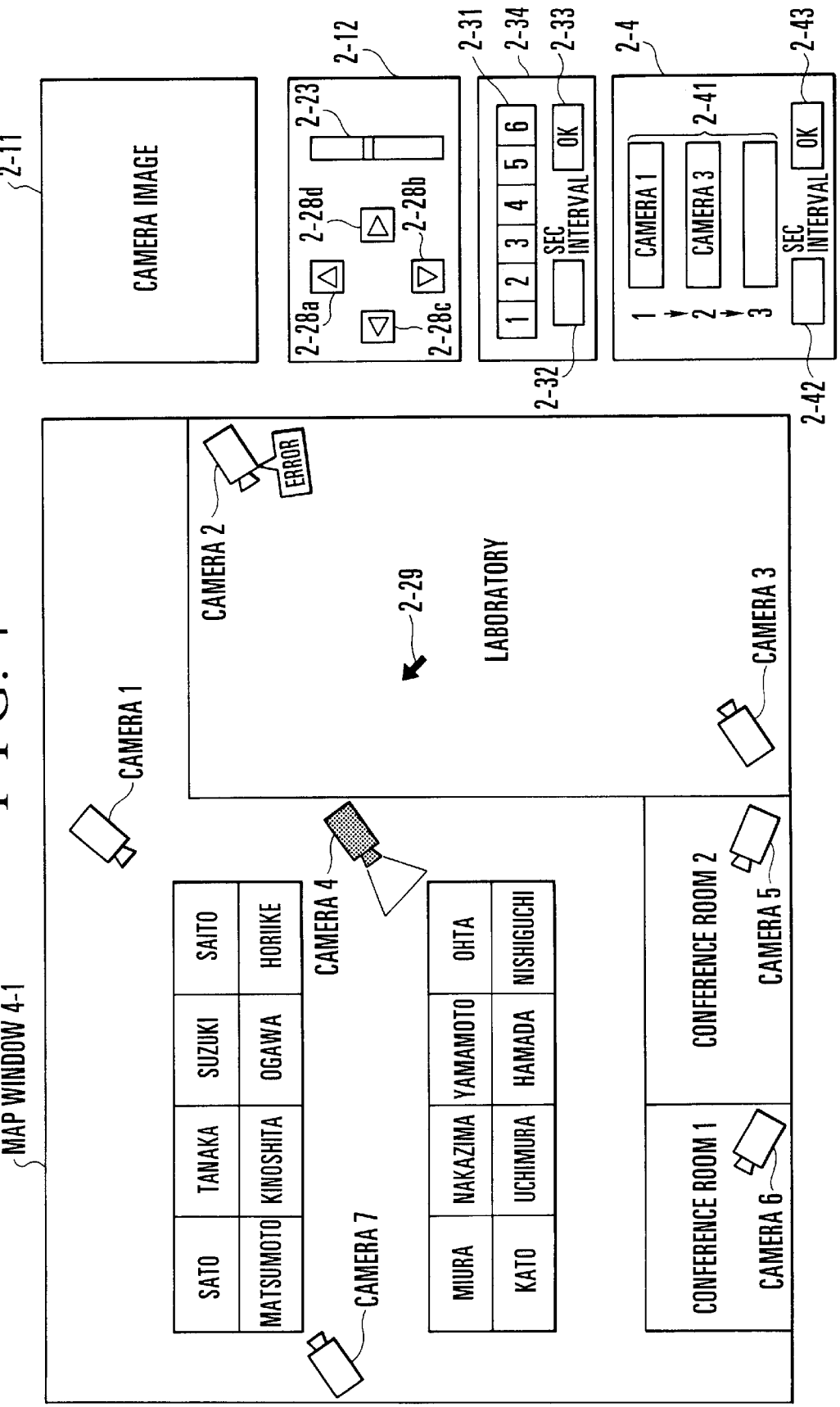
FIG. 4 shows one example of a display image plane obtained in a setting mode.

FIG. 4 shows one example of a display made on the display image plane 2-3 in the setting mode. Referring to FIG. 4, a map window 4-1 is provided for showing the locations of video cameras. An image window 2-11 is obtained by reducing the image window 2-1 in FIG. 2 and is arranged to display an image picked up by a video camera selected. A camera control window 2-12 is arranged in the same manner as the camera control window 2-2 in FIG. 2 to permit control over the image pickup direction and the zoom magnification of a video camera selected. The buttons of the camera control window 2-12 function in the same manner as the corresponding buttons of the camera control window 2-2 in FIG. 2 described above. Therefore, details of these buttons are omitted from description.

An image pickup direction setting window 2-34 is provided for setting the image pickup directions of the video camera selected. In setting the image pickup directions, the directions are decided by using the camera control window 2-12. After that, buttons 2-31 of the image pickup direction setting window 2-34 are serially turned on from a button "1" to store information on the image pickup direction and the zoom magnification either in the main storage device 1-23 or the secondary storage device 1-26. A button 2-33 is provided for deciding the result of this setting operation.

In the case of automatic operation of the video camera, image pickup directions are controlled, one after another, in the order of the setting operation on the buttons 2-31 (beginning with the button "1" among the buttons 2-31). An input part 2-32 is provided for setting the image pickup intervals of the video camera in the image pickup directions set in the above-stated manner.

A camera change-over setting window 2-4 is provided for setting intervals of change-over of the video camera desired to be automatically operated from one video camera to another. In the camera change-over setting window 2-4, a display part 2-41 is arranged to display the name of a video camera for which an icon representing the video camera on the map window 4-1 is selected by bringing the cursor 2-29 to the icon with the mouse and by clicking the mouse there.

A display part 2-42 of the camera change-over setting window 2-4 is provided for setting the intervals of change-over of the video cameras, i.e., a length of time for which an image picked up and outputted by each of the selected video cameras is allowed to be on display. A button 2-43 is provided for deciding the results of setting on the camera change-over setting window 2-4.

Figure 5:
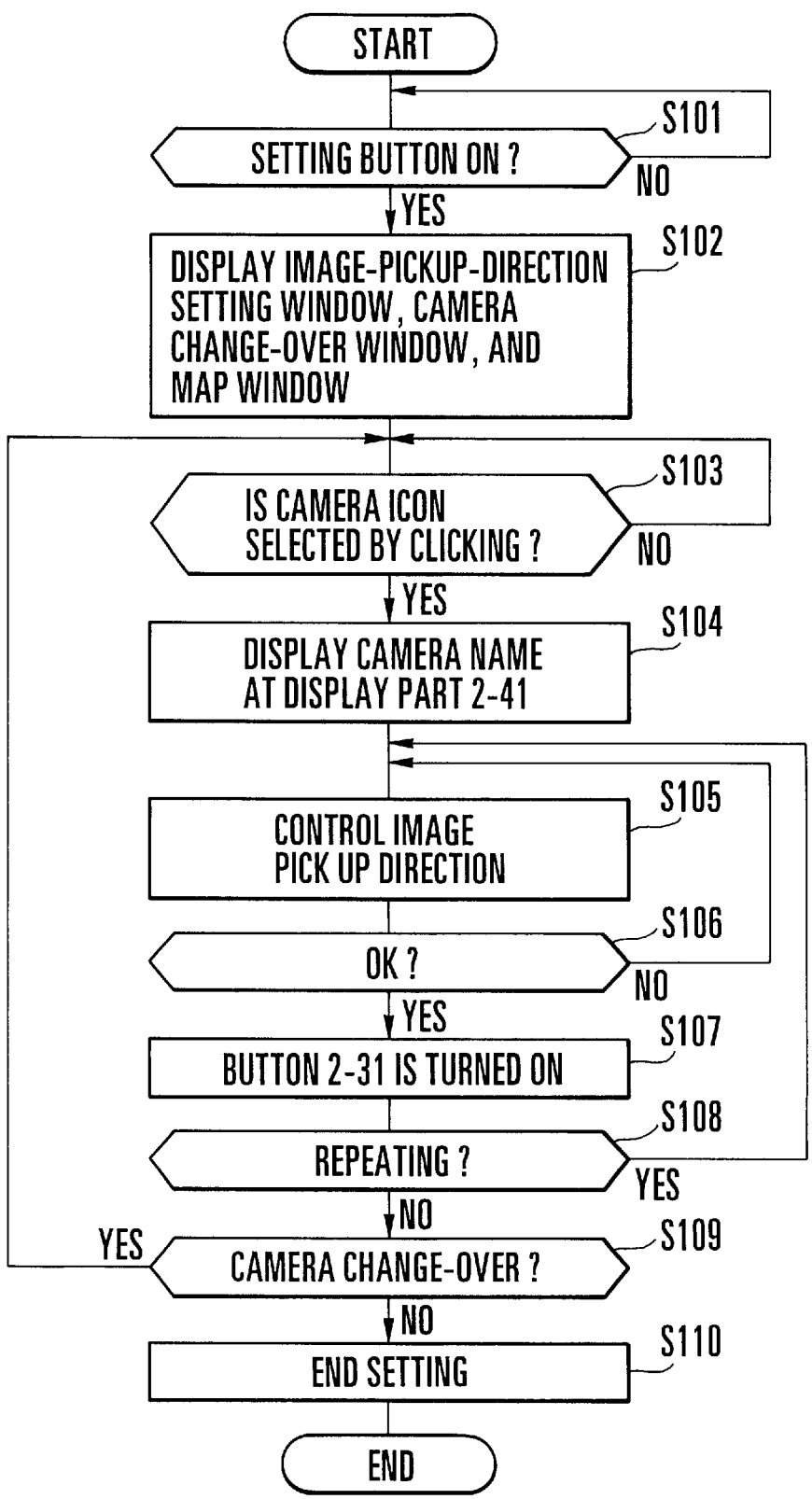
FIG. 5 is a flow chart showing an operation to be performed by a camera client device when an automatic camera operating mode is set.

FIG. 5 shows in a flow chart a flow of operation to be performed by the camera client device when an automatic operation of a video camera is set. A control program for control over this operation is stored in the secondary storage device 1-26. In executing the control program, the program is loaded on the main storage device 1-23 and executed by the CPU 1-22.

At a step S101 in FIG. 5, a check is made to find if the setting button 2-27 is turned on by moving the cursor 2-29 on the display image plane 2-3 shown in FIG. 2. If so, the flow proceeds to a step S102. At the step S102, the reduced image window 2-11 and the camera control window 2-23 are displayed as shown in FIG. 4. Then, in addition to these windows, the image pickup direction setting window 2-34 and the camera change-over window 2-4 are newly displayed.

At a step S103, a check is made to find if any of camera icons displayed on the map window 4-1 is selected by clicking the mouse. If so, the flow proceeds to a step S104. At the step S104, an image picked up by a video camera corresponding to the selected camera icon, i.e., a selected camera, is displayed on the image window 2-11. Then, it becomes possible to control the image pickup direction and the zoom magnification of the selected camera on the camera control window 2-12. Further, the name of the selected camera is displayed at the display part 2-41 of the camera change-over window 2-4. In the case of FIG. 4, a camera icon, or index, "CAMERA 1" is selected on the map window 4-1 by clicking. Therefore, in this case, a camera name "CAMERA 1" is displayed at the display part 2-41.

At a step S105, the camera control window 2-12 is operated to control the image pickup direction of the video camera. At a step S106, a check is made for the direction of the camera desired by the operator (user). At a step S107, one of the buttons 2-31, i.e., the button "1", for example, is turned on to vary a display state of "1". Then, information on the current image pickup direction and the zoom magnification obtained under the control are stored in the main storage device 1-23. Further, numerals "1", "2", "3", —which are shown on the buttons 2-31 in FIG. 4 indicate a sequence in which the camera is to be automatically controlled to have the set image pickup direction and the set zoom magnification.

At a step S108, a check is made to find if the operator wishes to set a plurality of setting values for the image pickup direction and the zoom magnification of the camera displayed on the image window 2-11. If so, the flow of operation returns to the step S105 to repeat the steps S105, S106 and S107. In this instance, any button that has already been used for setting among the buttons 2-31 does not respond to any operation of the cursor 2-29 by the mouse.

Further, information on a length of image pickup time in each image pickup direction set by the buttons 2-31 is inputted at the input part 2-32. The information on the image pickup time is inputted at the input part 2-32 before the result of setting the image pickup direction of the camera is decided by operating the OK button 2-33 by clicking the mouse.

When each of the image pickup directions and the image pickup time in the image pickup direction are set at the step S108, the automatic control setting for the camera is decided by operating the OK button 2-33 by clicking. The contents of the setting are then stored in the main storage device 1-23.

At the next step S109, a check is made to find if the operator wishes to newly carry out automatic control setting for another camera after completion of setting for one camera. If so, the flow returns to the step S103 to select the icon of that camera by clicking the mouse. In response to this selection, an image picked up by the camera is displayed on the image window 2-11 to make the camera controllable. The name of the camera is displayed at the display part 2-41 of the camera change-over window 2-4. In the case of FIG. 4, the camera name is displayed as "CAMERA 3". Then, the processes of the steps from S104 to S108 are executed. Further, at the input part 2-42, information on the automatic operation control time for each of the set cameras, i.e., camera change-over time, is inputted. The information on the camera change-over time is inputted at the input part 2-42 before the result of automatic operation control setting for all the selected cameras is decided.

When the automatic operation setting for all the cameras is found at the step S109 to have been finished, the flow proceeds to a step S110 to bring the setting operation to an end by clicking at the button 2-43.

After the button 2-43 is operated by clicking the mouse, the bit-mapped display 1-21 returns to the image plane shown in FIG. 2, and the automatic operation for video cameras begins on the basis of the above-stated setting.

Figure 6:
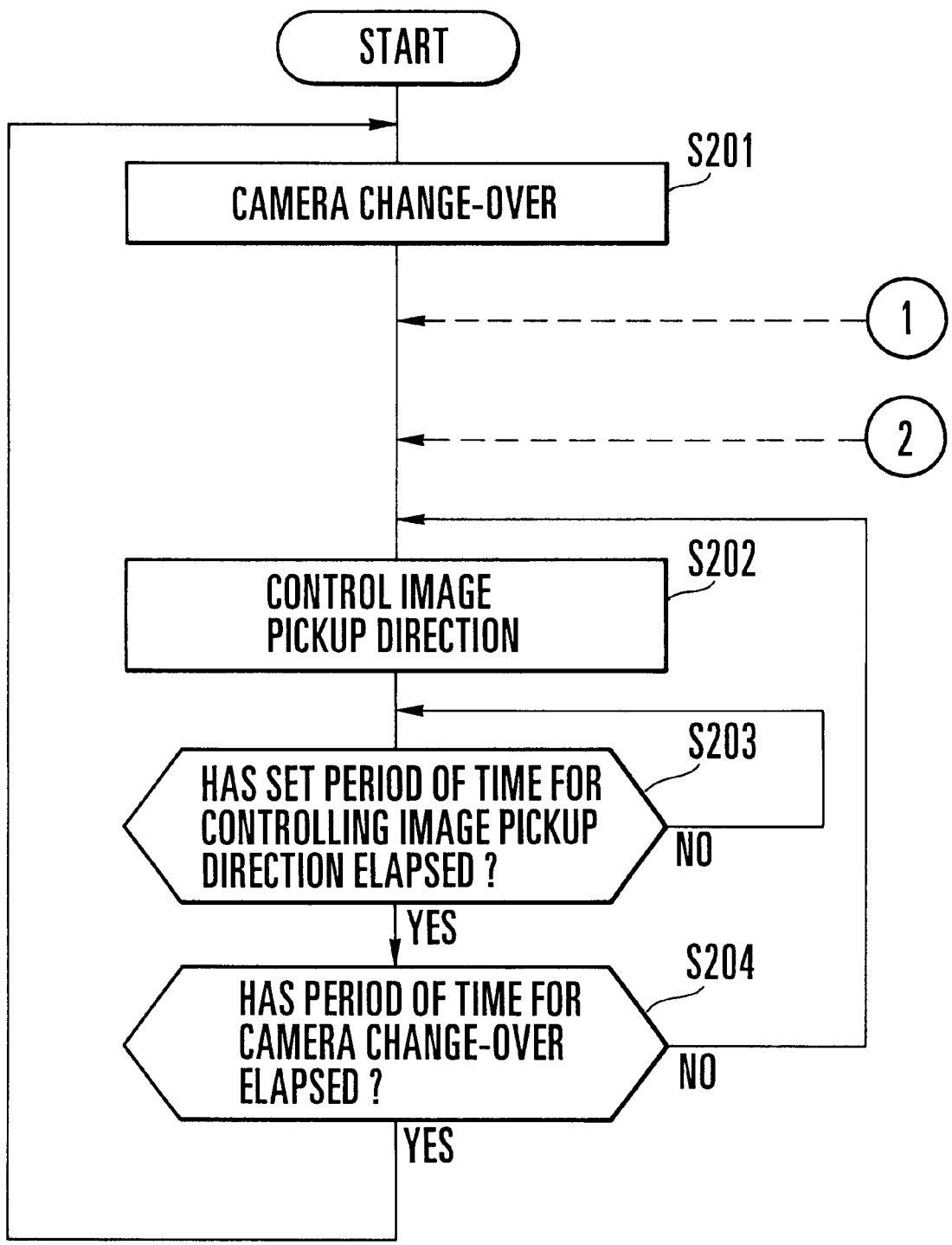
FIG. 6 is a flow chart showing the operation processes of the camera client device to be performed in controlling the automatic camera operation.

FIG. 6 is a flow chart showing the operation processes to be carried out by the camera client device which performs control over the automatic operation of a video camera on the basis of the camera automatic operation setting made in the manner described above. A program to be used in executing the control is stored in the secondary storage device 1-26 of the camera client device 1-2. At the time of actually executing the program, the program is loaded on the main storage device 1-23. The program is carried out by the CPU 1-22 on the basis of the information on the automatic operation setting stored also in the main storage device 1-23.

At a step S201 in FIG. 6, a control instruction is first carried out for the camera the name of which is displayed at the part "1" of the display part 2-41 of the camera change-over window 2-4 (in the case of FIG. 4, "CAMERA 1"). An image picked up by this camera is taken in the image window 2-1.

At the next step S202, an instruction for the image pickup direction and the zoom magnification set by the button "1" of the buttons 2-31 is sent to the camera server device of the camera to be controlled.

At a step S203, a check is made to find if the length of time set by the input part 2-32 has elapsed. If so, the flow of operation proceeds to a step S204. At the step S204, a check is made to find if the camera change-over time has elapsed. If not, the flow returns to the step S202 to send an instruction to the camera server device to shift the image pickup direction of the controlled camera set by the button "1" of the buttons 2-3, for example, to an image pickup direction set by the button "2" of the buttons 2-31 through the shortest route.

The image pickup direction control instructions are sent in this manner to cause, at the lapse of every set time interval, the controlled camera to serially have the image pickup directions set by the buttons 2-31 in sequence of the buttons "1", "2", "3", . . . . Further, the image picked up by the camera under control and the name of the camera are displayed on the image window 2-1. In the case of FIG. 2, the camera name is displayed as "CAMERA 1". Upon completion of control for all the image pickup directions, the same control is repeated in the same sequence beginning with the image pickup direction set by the button "1" of the buttons 2-31.

The processes of the steps S202 and S203 are thus repeated after the step S204 until arrival of time for change-over from one camera to another.

When a time count by the timer 1-28 reaches the camera change-over time inputted by the input part 2-42, at the step S204, the flow returns to the step S201 to release from control the camera which has been used for the image display. After that, an instruction for automatic operation control over the camera the name of which is displayed at the part "2" of the display part 2-41 ("CAMERA 3" in the case of FIG. 4) is carried out at the steps S202 and S203.

As described above, when the length of time of control over one camera reaches the camera change-over time set and inputted by the input part 2-42, the camera under the automatic operation control is changed from one camera over to another in the sequence of camera names displayed at parts "1", "2", "3", . . . of the display part 2-41. Upon completion of automatic operation on all cameras, the instructions for automatic operation are again carried out on the cameras in the sequence of their names shown at the parts "1", "2", "3", . . . of the display part 2-41.

The camera control system according to the embodiment is arranged, as described above, to enable the operator to freely set a plurality of image pickup directions of any camera that is picking up desired images. Further, the camera control system is arranged to permit observation of images picked up by different cameras by automatically changing the use of cameras from one over to another. The arrangement, therefore, obviates the necessity of manual control over these cameras and also permits observation of images picked up at different places.

Figure 7:
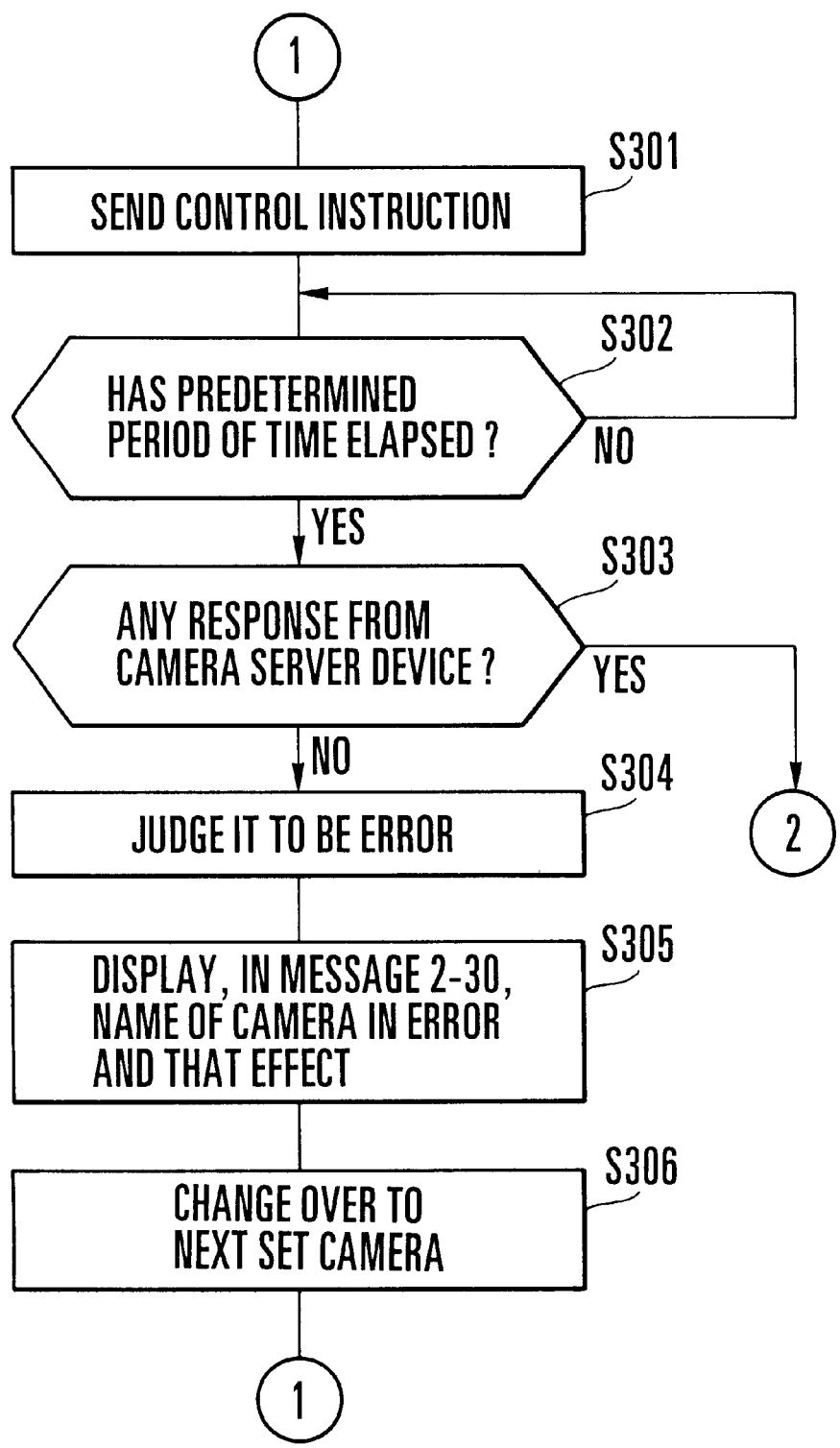
FIG. 7 is a flow chart showing the operation processes of the camera client device to be performed in the event of occurrence of an error in a camera in controlling the automatic camera operation.

It is conceivable that some error might be caused to take place at some of cameras due to a service interruption of the network or a malfunction of the camera which prevents images from being sent to the camera client device. FIG. 7 is a flow chart showing, in addition to the processes of FIG. 6, operation processes to be performed on the side of the camera client device in the event of occurrence of such an error.

At a step S301 in FIG. 7, in changing one camera under control over to another among the cameras connected to the network in the set sequence, the camera client device outputs to the camera server device connected to the next camera a control instruction for transmitting data of an image picked up by that camera and for controlling the set image pickup direction of that camera.

At a step S302, the time count by the timer 1-28 is checked to find if a predetermined period of time has elapsed after the control instruction is sent to the camera server device. If so, the flow proceeds to a step S303. At the step S303, a check is made for any response from the camera server device to the camera client device, such as image data from the camera server device. If no response is found, the flow of operation proceeds to a step S304. At the step S304, it is judged that some error has occurred in the camera under control, and the flow proceeds to a step S305.

At the step S305, the name of the camera judged to have the error occurring and the occurrence of the error are displayed at the message part 2-30 shown in FIG. 2. In the case of FIG. 2, the message reads "CAMERA 3 ERROR".

At a step S306, the camera to be controlled is changed over to the next set camera by skipping the camera judged to have the error occurring. In the case of this embodiment, even in the event of occurrence of an error, if any image data is sent to the camera client device, the image picked up by the camera where the error has occurred is allowed to be displayed, although the message part 2-30 is, in the meantime, caused to show the name of the camera where the error has occurred, in the above-stated manner.

Since the processes described above are carried out on the side of the camera client device to display the name of the camera where an error has occurred and the occurrence of the error, the display enables the operator to promptly know the camera where the error has occurred and to act as necessary.

Further, the arrangement for allowing the automatic operation to be performed on the next camera by skipping the camera judge to have an error occurring enables the operator to observe images picked up by other cameras which operate in a normal manner and have their image data transmitted via the network in a normal manner.

In the case of the operation processes of the camera client device shown in FIG. 7, the control over the cameras is changed from one camera over to another by skipping any camera that is found to have an error occurring. The flow of operation processes, however, may be modified to make an image display in black color for any camera where the error has occurred for a period of time until arrival of the time for change-over to another camera set by the input part 2-42.

Figure 8:
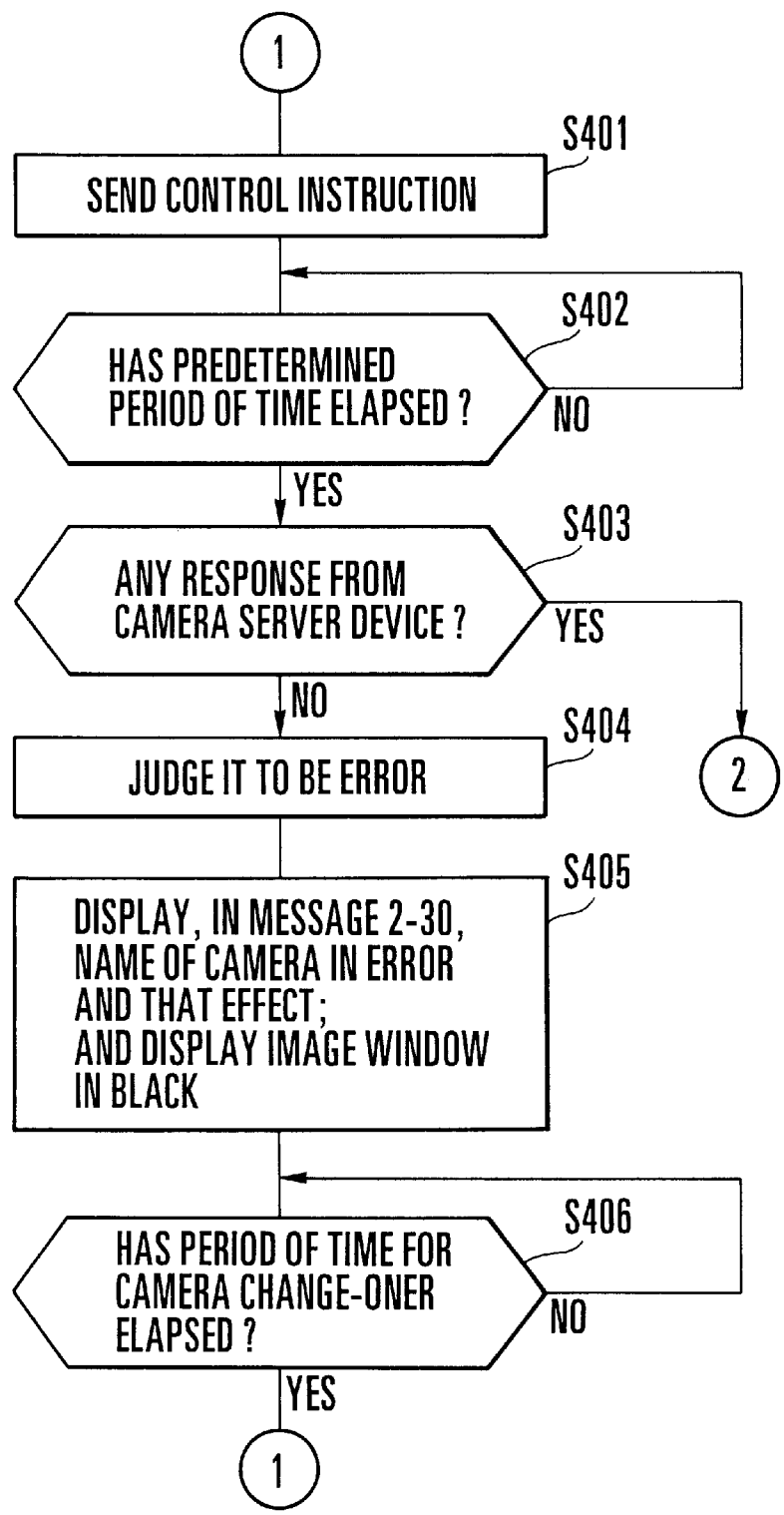
FIG. 8 is a flow chart showing also the operation processes of the camera client device to be performed in the event of occurrence of an error in a camera in controlling the automatic camera operation.

FIG. 8 is a flow chart showing the above-stated modification. Similar to the case of FIG. 7, the operation processes shown in FIG. 8 are arranged to be added to the flow of operation of the camera client device shown in FIG. 6 in the event of occurrence of a camera error.

In the flow chart of FIG. 8, steps S401 to S404 are identical with the steps S301 to S304 in the flow chart of FIG. 7. Therefore, the details of the steps S401 to S404 are omitted from the following description.

Figure 9:
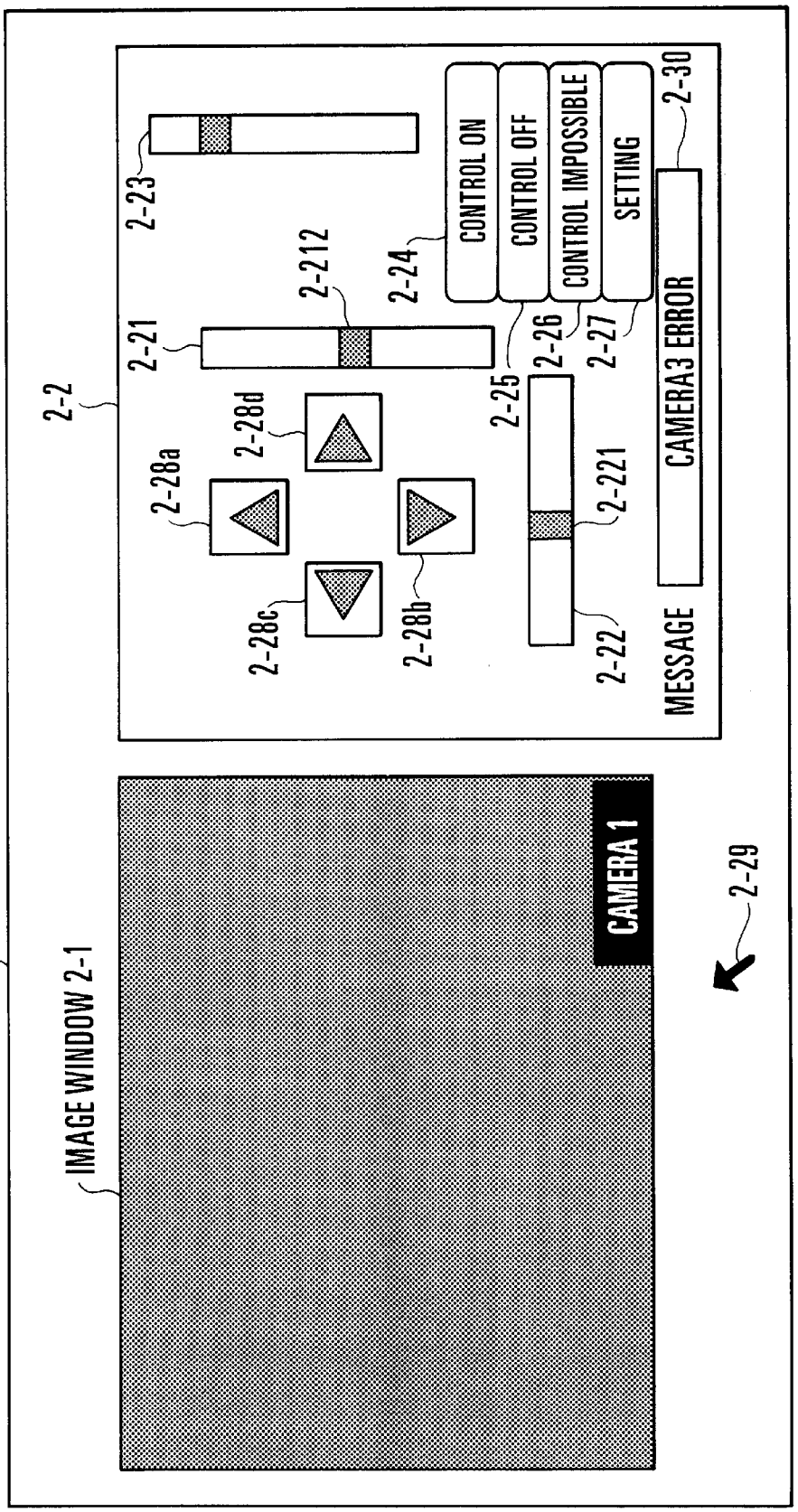
FIG. 9 shows one example of a user interface image plane obtained when an error takes place.

In a case where a camera is judged to have an error occurring at the step S404 with no response received from the camera server device connected to the camera in question, the flow of operation proceeds to the next step S405. At the step S405, the occurrence of the error and the name of the camera judged to have the error occurring are displayed at the message part 2-30 as shown in FIG. 2. In the case of FIG. 2, the message part 2-30 reads "CAMERA 3 ERROR". In addition to this message, a black image is displayed on the image window 2-1 together with the name of the camera which is under control but found to have the error occurring, as shown in FIG. 9.

At a step S406, a check is made for the count time of the timer 1-28 to find if the period of time set for change-over by the input part 2-42 has elapsed after the control instruction has been issued for control over the camera judged to have the error occurring. If so, the control instruction is changed to control the next set camera.

The arrangement described above also includes a process of displaying the message showing the occurrence of an error and the name of the camera where the error has occurred, as described above. The arrangement, therefore, likewise causes the operator to know the occurrence of an error and the name of the camera where the error has occurred to enable the operator to promptly act as necessary.

Further, the arrangement for displaying a black image on the image window 2-1 enables the operator to clearly know the occurrence of an error during a period of control time before the time of change-over and to take a necessary action for the camera where the error has occurred.

The embodiment described above is arranged to perform an automatic operation on cameras while displaying the image plane shown in FIG. 2 on the bit-mapped display 1-21 of the camera client device 1-2. The use of the image plane shown in FIG. 2, however, may be replaced with the image plane shown in FIG. 4 in carrying out the automatic operation on the cameras.

In a case where the automatic camera operation is performed according to the procedures of the flow chart of FIG. 6 while displaying the image plane shown in FIG. 4 on the bit-mapped display 1-21 of the camera client device 1-2, the image picked up by the camera under control is displayed on the image window 2-11, and the camera icon representing this camera is displayed on the map window 4-1 in a shape which differs from the shape of other camera icons which represent other cameras also on the map window 4-1. For example, as shown in FIG. 4, an image picked up by a camera 4 is displayed on the image window 2-11 while the camera icon representing the camera 4 on the map window 4-1 is displayed in a shape which differs from the shape of other camera icons also displayed on the map window 4-1. This arrangement enables the operator (or user) to accurately know which of the cameras is picking up an image currently on display even when the camera providing an image displayed on the image window 2-11 changes from one camera over to another. Further, the camera control system according to the invention may be arranged such that, in a case where an error takes place in some camera which is currently in automatic operation, the shape of the camera icon representing this camera on the map window 4-1 is changed to have a different shape from other camera icons which are also on display on the map window 4-1. For example, in the case of FIG. 4, the camera icon representing a camera 2 on the map window 4-1 is caused to change its shape to inform the operator that the camera 2 has an error occurring.

The functions of the embodiment described above can be also carried out by providing a system or an apparatus with a storage medium in which software program codes are recorded, and reading the program codes from the storage medium with a computer (or a CPU or MPU) and executing the program codes.

In the above-stated case, the functions of the embodiment described above can be carried out by the program codes read out from the storage medium. Thus, the storage medium in which the program codes are stored can be considered to constitute the invention.

The storage medium to be used for supplying the above-stated program codes can be selected, for example, from among storage media such as a floppy disk, a hard disk, an optical disk, a magneto-optical disk, a CD-ROM, a CD-R, a magnetic tape, a nonvolatile memory card and a ROM.

Further, with the program codes read out and executed by a computer, it is possible not only to allow the computer to carry out the functions of the embodiment disclosed but also to allow an OS (operating system) working on the computer to execute a part of or all of actual processes of the functions.

Further, after the program codes read out from the storage medium are written into a function expanding board inserted in a computer or into a memory included in a function expanding unit connected to the computer, a part of or all of the actual processes of the program codes can be executed by a CPU or the like included in the function expanding board or the function expanding unit. The functions of the embodiment disclosed can be carried out by such processes.

In a case where the arrangement of the embodiment disclosed is applied to the storage medium as mentioned above, program codes corresponding to the flow charts described in the foregoing are to be stored in the storage medium. In short, modules indispensable to the camera control system according to the invention are stored in the storage medium.

As described in the foregoing, the embodiment is arranged to automatically change an image outputted from one camera over to an image outputted from another camera at intervals of a suitable period of time and also to automatically control the image pickup directions of each of the cameras. The arrangement saves the user from any troublesome operation otherwise required in observing images picked up by cameras over a long period of time.

In the event of occurrence of an error while any of the cameras is in automatic operation, a notification of the occurrence of the error is clearly and promptly given to the client side. This arrangement enables the user (operator) to promptly cope with the error. Further, the arrangement for carrying on the automatic operation control by skipping the camera where the error has occurred permits observation of images picked up by other normally operating cameras without wasting time.

What is claimed is:

1. A camera control system for controlling a plurality of video cameras, comprising:

a display device arranged to display a map on which symbols representing said plurality of video cameras are disposed, and a list that indicates an order of said plurality of video cameras to be controlled automatically one by one; and a video camera setting device arranged to set the order of said plurality of video cameras to be controlled and make said display device display names of said plurality of video cameras on the list automatically one by one, in response to an order of being designated symbols one by one on the map.

2. A system according to claim 1, wherein:

said video camera setting device sets an order of a plurality of image pickup directions to be sequentially controlled for each of the video cameras.

3. A system according to claim 1, wherein:

said video camera setting device assigns a control time for each of said plurality of video cameras.

4. A system according to claim 1, further comprising:

a control device adapted to control automatically each of the plurality of video cameras one by one in order on a basis of a setting result;

wherein said display device displays an image of a video camera currently controlled by said control device.

5. A control method capable of controlling a plurality of video cameras, comprising:

a displaying step of displaying a map or which symbols representing said plurality of video cameras are disposed, and a list that indicates an order of said plurality of video cameras to be controlled automatically one by one; and a video camera setting step of setting the order of said plurality of video cameras to be controlled and making said display step display names of said plurality of video cameras on the list automatically one by one, in response to an order of being designated symbols one by one on the map.

6. A control method according to claim 5, further comprising:

an image pickup direction setting step of setting an order of a plurality of image pickup directions to be sequentially controlled for each of the video cameras set in said video camera setting step.

7. A control method according to claim 5, further comprising:

an assigning step of assigning a control time for each of said plurality of video cameras.

8. A control method according to claim 5, further comprising:

a controlling step of controlling automatically each of the plurality of video cameras in order on a basis of a setting result set in said video camera setting step;

an outputting step of outputting an image of a video camera currently controlled in said controlling step.

9. A storage medium which stores therein a program for executing control over a camera control system capable of controlling a plurality of video cameras, said program comprising the processes of:

displaying a map on which symbols representing said plurality of video cameras are disposed, and a list that indicates an order of said plurality of video cameras to be controlled automatically one by one; and setting the order of said plurality of video cameras to be controlled and making said displaying display names of said plurality of video cameras on the list automatically one by one, in response to an order of being designated symbols one by one on the map.

10. A storage medium according to claim 9, wherein said program further comprising the process of:

setting an order of a plurality of image pickup directions to be sequentially controlled for each of the video cameras to be controlled.

11. A storage medium according to claim 9, wherein said program further comprising the process of:

assigning a control time for each of said plurality of video cameras to be controlled.

12. A storage medium according to claim 9, wherein said program further comprising the processes of:

controlling automatically each of the plurality of video cameras in order on a basis of a setting result;

outputting an image of a video camera currently controlled.

* * * * *

UNITED STATES PATENT AND TRADEMARK OFFICE
CERTIFICATE OF CORRECTION

PATENT NO.    : 6,597,393 B2
DATED         : July 22, 2003
INVENTOR(S)   : Eiji Kato et al.

It is certified that error appears in the above-identified patent and that said Letters Patent is hereby corrected as shown below:

Column 2,
Line 59, delete "12" and insert -- 1-2 --.

Signed and Sealed this

Seventeenth Day of August, 2004

JON W. DUDAS
*Acting Director of the United States Patent and Trademark Office*